US008856271B2

(12) United States Patent
Ma

(10) Patent No.: US 8,856,271 B2
(45) Date of Patent: Oct. 7, 2014

(54) DATA ACCESSING METHOD USED FOR CUSTOMER PREMISES EQUIPMENT, AND CUSTOMER PREMISES EQUIPMENT

(75) Inventor: Xiaoliang Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 47 days.

(21) Appl. No.: 13/259,025

(22) PCT Filed: Aug. 5, 2010

(86) PCT No.: PCT/CN2010/075748
§ 371 (c)(1),
(2), (4) Date: Mar. 26, 2012

(87) PCT Pub. No.: WO2011/106965
PCT Pub. Date: Sep. 9, 2011

(65) Prior Publication Data
US 2012/0179775 A1   Jul. 12, 2012

(30) Foreign Application Priority Data

Mar. 3, 2010  (CN) .......................... 2010 1 0118328

(51) Int. Cl.
*G06F 15/16*   (2006.01)
*G06F 15/173*   (2006.01)
*H04L 12/66*   (2006.01)
*H04W 48/18*   (2009.01)
*H04L 12/54*   (2013.01)
*H04L 12/28*   (2006.01)

(52) U.S. Cl.
CPC ........... *H04W 48/18* (2013.01); *H04L 12/5692* (2013.01); *H04L 12/66* (2013.01); *H04L 12/2856* (2013.01)
USPC ............................. 709/217; 709/238; 370/352

(58) Field of Classification Search
CPC .. H04L 12/2856; H04L 12/5692; H04L 12/66
USPC .................... 709/217, 238; 370/331, 352, 400
See application file for complete search history.

(56) References Cited

U.S. PATENT DOCUMENTS 5,995,606 A * 11/1999 Civanlar et al. .......... 379/207.13
6,058,433 A *  5/2000 Gilbert .......................... 709/250
(Continued)

FOREIGN PATENT DOCUMENTS

| CN | 1708954 A | 12/2005 |
|---|---|---|
| CN | 101145937 A | 3/2008 |
| CN | 101192936 A | 6/2008 |

OTHER PUBLICATIONS

International Search Report for International Application No. PCT/CN2010/075748, completed Nov. 26, 2010, mailed Dec. 16, 2010 (English Language Translation Provided) (6 pages).

(Continued)

*Primary Examiner* — Jeong S Park
(74) *Attorney, Agent, or Firm* — Clark & Elbing LLP

(57) ABSTRACT

The present invention discloses a data accessing method used for CPE and CPE, wherein the data accessing method used for the CPE comprises: acquiring destination domain information; determining a gateway corresponding to the destination domain information according to a preset domain grouping table, wherein the domain grouping table is used to store a corresponding relationship between the destination domain information and the gateway; and accessing data through a modem mapped with the determined gateway. By virtue of the present invention, it can enable the users, when using services provided by operators, to quickly and conveniently access the services provided by different operators, thereby effectively avoiding the phenomena that the speed of accessing or downloading is slow and the access cannot even be achieved when the users cannot select a suitable operator in the prior art.

4 Claims, 6 Drawing Sheets

(56) References Cited

U.S. PATENT DOCUMENTS

| | | |
|---|---|---|
| 2003/0128710 A1* | 7/2003 | Fedyk et al. ............... 370/400 |
| 2004/0004965 A1* | 1/2004 | Chen et al. ............... 370/395.2 |
| 2006/0069773 A1 | 3/2006 | Clark |
| 2009/0016325 A1* | 1/2009 | Al-Bakri ............... 370/352 |
| 2009/0233552 A1* | 9/2009 | Kim et al. ............... 455/62 |
| 2009/0238165 A1 | 9/2009 | Cai et al. |
| 2010/0316021 A1* | 12/2010 | Lerzer et al. ............... 370/331 |
| 2012/0303845 A1* | 11/2012 | Ma et al. ............... 710/62 |

OTHER PUBLICATIONS

International Preliminary Report on Patentability for International Application No. PCT/CN2010/075748, issued Sep. 4, 2012 (English Language Translation Provided) (8 pages).

Written Opinion of the International Searching Authority for International Application No. PCT/CN2010/075748, completed Dec. 3, 2010, mailed Dec. 16, 2010 (English Language Translation Provided) (6 pages).

* cited by examiner

DATA ACCESSING METHOD USED FOR CUSTOMER PREMISES EQUIPMENT, AND CUSTOMER PREMISES EQUIPMENT

FIELD OF THE INVENTION

The present invention relates to the field of communication technology, in particular to a data accessing method used for CPE (Customer Premises Equipment) and CPE.

BACKGROUND OF THE INVENTION

With the rapid development of the wireless communication technology and the continuous enlargement of the network scale, the 3G technology has been more and more widely applied in the daily life of people. USB (Universal Serial Bus) interface, as a currently used general purpose interface, has been widely applied in wireless communication terminals such as CPE (Customer Premises Equipment) which is used widely in the 3G technology, so as to act as an interface of the terminal equipment and transmit voice and other data information at the same time.

Currently, there are mainly two kinds of CPE-type products: one is to directly integrate one wireless module within a motherboard of the CPE, and some common functions such as dialing, surfing the web and calling and so on can be achieved; and the other is a CPE product having an adapter, by using the adapter, the CPE can be adapted to multiple kinds of modems, especially to a USB modem, in this case, the adapter has a USB interface, after having been adapted by this adapter, the above first service can be achieved as long as plugging in a USB modem regardless of which system of the USB adapter.

When a CPE product is using internet services, because different services are operated by different operators, when the user is using or downloading these services, the services provided by the operator corresponding to the SIM (Subscriber Identity Module) card of the CPE can have a faster speed of using and downloading, while the services provided by the other operators may cause the restriction for network speed of the CPE accessing the terminal equipment and the embarrassment for services access bottleneck across the operators' networks, for example, the phenomena that the speed of accessing or downloading is slow and the access cannot even be achieved often occur when the user whose operator of the SIM card is Telecom is accessing the services provided by Netcom. Therefore, when a user is downloading a plurality of resources, in order to achieve better downloading quality, he must artificially select a network which accords with the operator corresponding to the SIM card, however, he cannot select a suitable operator when the resources are limited or he does not know which operator the resources belong to, thus the downloading speed and quality cannot be guaranteed. In addition, the same problem also exists when dialing the telephone, and because the charge across the operators is higher than that in the same operator, it often can cause cost burden to the users.

SUMMARY OF THE INVENTION

The main object of the present invention is to provide a data accessing method used for CPE and CPE, so as to at least solve the above problem.

A data accessing method used for CPE is provided according to one aspect of the present invention, the method comprises the following steps of: acquiring destination domain information; determining a gateway corresponding to the destination domain information according to a preset domain grouping table, wherein the domain grouping table is used to store a corresponding relationship between the destination domain information and the gateway; and accessing data through a modem mapped with the determined gateway.

Preferably, the data accessing method used for the CPE further comprises: before acquiring the destination domain information, respectively connecting a plurality of universal serial bus (USB) interfaces of the CPE to USB modems with different systems.

Preferably, the step of respectively connecting a plurality of USB interfaces of the CPE to USB modems with different systems comprises: acquiring type information and system information of the plurality of USB modems; respectively loading USB serial port drivers or USB network port drivers for the USB modems according to the type information; and respectively loading drive instruction sets for the USB modems according to the system information.

Preferably, after respectively connecting a plurality of USB interfaces of the CPE to the USB modems with different systems, it further comprises: respectively mapping the USB modems to the gateways.

Preferably, the domain grouping table is an internet protocol (IP) address domain grouping table and the destination domain information is IP address domain information; or, the domain grouping table is a destination voice number grouping table and the destination domain information is a destination voice number.

Customer Premises Equipment CPE is also provided according to another aspect of the present invention, and the CPE comprises: an acquisition module, configured to acquire destination domain information; a determination module, configured to determine a gateway corresponding to the destination domain information according to a preset domain grouping table, wherein the domain grouping table is used to store a corresponding relationship between the destination domain information and the gateway; and an access module, configured to access data through a modem mapped with the determined gateway.

Preferably, the CPE comprises a plurality of USB interface which are configured to be connected respectively to USB modems with different systems.

Preferably, the CPE further comprises: a modem information acquisition module, configured to acquire type information and system to information of the plurality of USB modems; a driver load module, configured to respectively load USB serial port drivers or USB network port drivers for the USB modems according to the type information; and an instruction load module, configured to respectively load drive instruction sets for the USB modems according to the system information.

Preferably, the CPE further comprises: a mapping module, configured to respectively map the USB modems to the gateways.

Preferably, the domain grouping table is an internet protocol (IP) address domain grouping table and the destination domain information is IP address domain information; or, the domain grouping table is a destination voice number grouping table and the destination domain information is a destination voice number.

By virtue of setting a domain grouping table having a corresponding relationship between destination domain information and the gateway in the CPE, the present invention enables the user to find a suitable gateway quickly according to the destination domain when using the services provided by the operators, and thus to access the services provided by different operators quickly and conveniently through a modem corresponding to this gateway, thereby effectively avoiding the phenomena that the speed of accessing or downloading is slow and the access cannot even be achieved when the users cannot select a suitable operator in the prior art.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

The present invention is described hereinafter in detail with reference to the accompanying drawings and in combination with the embodiments. It should be explained that the embodiments and the features of the embodiments in the present application can be combined with each other under the circumstances that there is no conflict.

Figure 1:
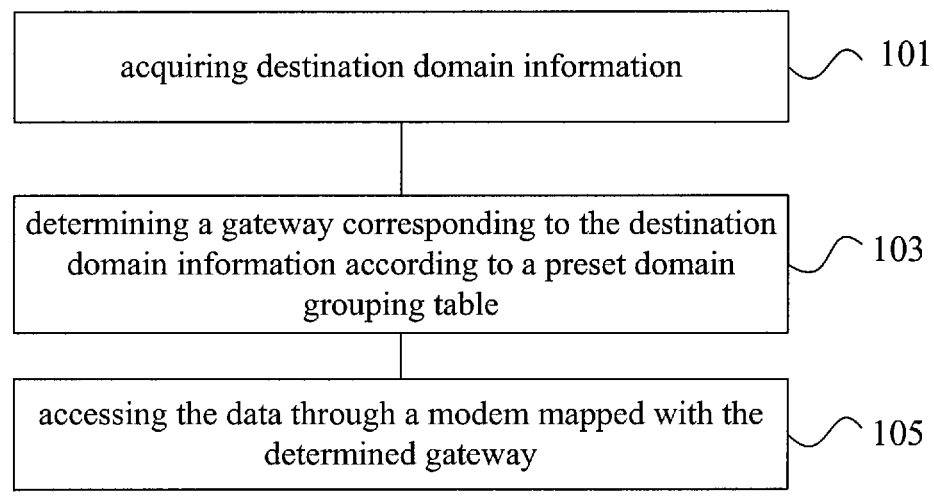
FIG. 1 is a step flow chart of a data accessing method used for the CPE according to embodiment 1 of the present invention.

With reference to FIG. 1, it shows a step flow chart of a data accessing method used for the CPE according to embodiment 1 of the present invention and can specifically include steps as follows.

Step 101, acquiring destination domain information.

The destination domain information can be IP address domain information to be accessed by users or a destination voice number which is dialed by users.

Step 103: determining a gateway corresponding to the destination domain information according to a preset domain grouping table.

The domain grouping table can include an IP address domain grouping table and/or a destination voice number grouping table. The IP address domain grouping table stores a corresponding relationship between the IP address domain information and the gateway, and the destination voice domain grouping table stores a corresponding relationship between the destination voice number and the gateway.

By way of the IP address domain grouping table, it enables the users to find conveniently a suitable gateway to perform fast data access and download when accessing the internet data; and by way of the destination voice number grouping table, it enables the users to find quickly and conveniently the network to which the dialing number belongs when dialing the telephone, especially when dialing the telephone of different operators' networks, thereby reducing the users' cost.

Step 105: accessing the data through a modem mapped with the determined gateway.

A plurality of modems (MODEMs) can be included, and each MODEM maps with a gateway. The MODEM can be a USB MODEM. The CPE determines a gateway corresponding to the destination domain according to the domain grouping table, and then determines, according to a mapping relationship between the gateway and the MODEM, to access the data or dial a voice call through the MODEM.

By virtue of the present embodiment, it enables the users to make the most appropriate choice among the networks across the operators when the users do not know which operator provides the service being used, so as to exert the highest service downloading speed of the CPE.

Figure 2:
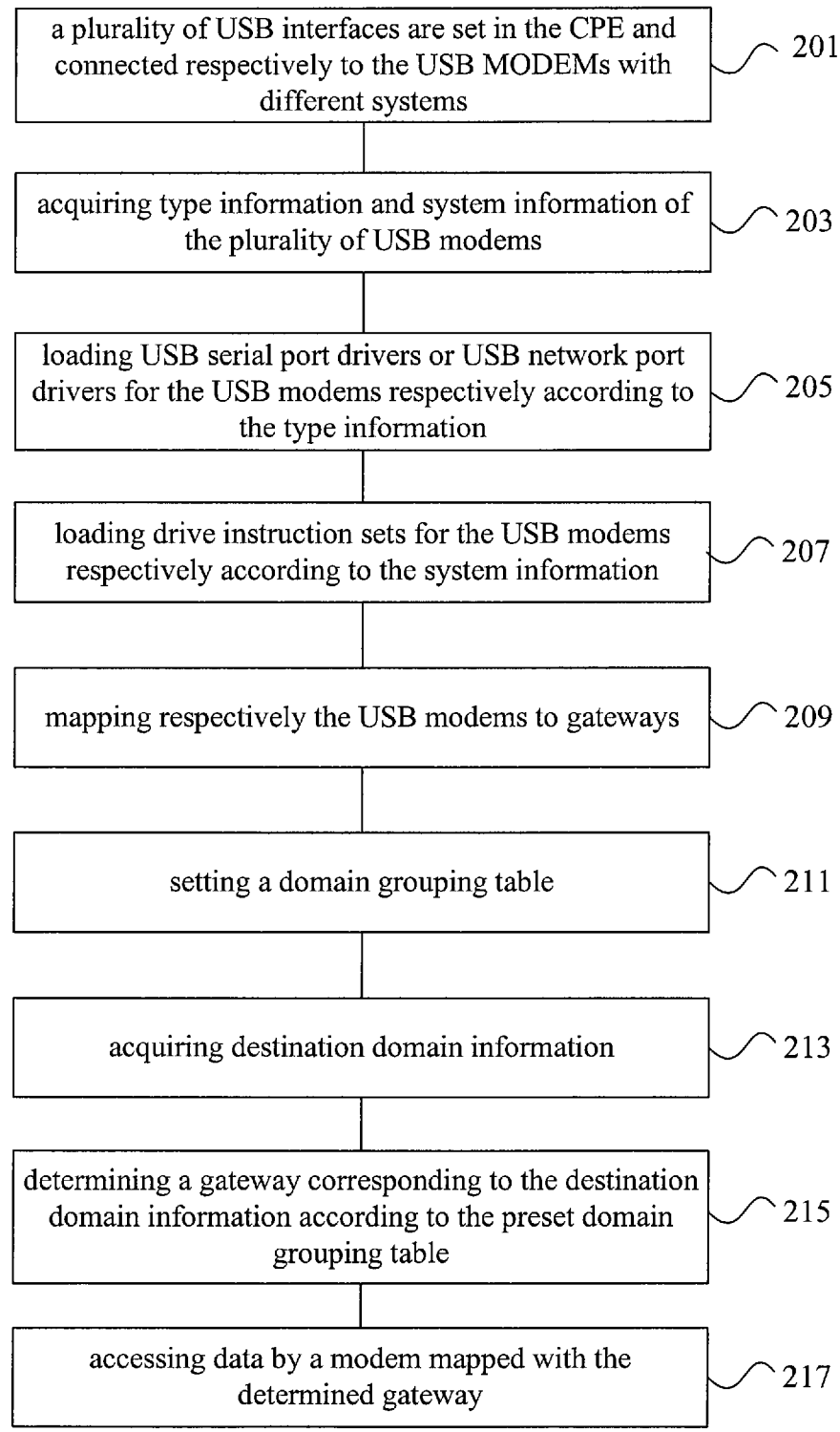
FIG. 2 is a step flow chart of a data accessing method used for the CPE according to embodiment 2 of the present invention.

With reference to FIG. 2, it shows a step flow chart of a data accessing method used for CPE according to embodiment 2 of the present invention, and in the present embodiment, the CPE is set with a plurality of USB interfaces, each of which can be connected with a USB MODEM, wherein these USB MODEMs are the USB MODEMs with different systems. After being connected to a USB MODEM, a mapping relationship between the USB MODEM and a gateway is established. When accessing data or dialing the telephone, the CPE first determines a gateway used by the data to be accessed according to the domain grouping table, and then accesses the data to be accessed through the USB MODEM mapped with the gateway. The following steps can be included specifically.

Step 201: setting a plurality of USB interfaces in the CPE, and respectively connecting the USB interfaces to USB MODEMs with different systems.

In this step, it needs to be noted that those skilled in the art can select suitable MODEMs according to actual needs, and if the selected MODEMs are not USB MODEMs, a plurality of MODEMs with different systems can be set directly in the CPE without any need to set USB interfaces for the connection.

Step 203: acquiring type information and system information of the plurality of USB modems.

The modem information of each USB MODEM in the plurality of USB modems is acquired, wherein the modem information includes type information and system information, and it can also include: manufacturer information of the USB MODEM, PID (product identifier), VID (vendor identifier) and CLASS ID (class identifier) and so on.

Step 205: respectively loading USB serial port drivers or USB network port drivers for the USB modems according to the type information.

In this step, the CPE judges whether each USB MODEM is a serial port device or a virtual network port device according to the type information thereof If it is a serial port device, a USB serial port driver is loaded for the USB MODEM; and if it is a virtual network port device, a USB network port driver is loaded for the USB MODEM.

Step 207: respectively loading drive instruction sets for the USB modems according to the system information.

In this step, the CPE loads the instruction set for each USB MODEM according to the system information of the USB MODEM. For example: if the USB MODEM is a W-MODEM, a W instruction set is loaded for the USB MODEM, and if the USB MODEM is a TD-MODEM, a TD instruction set is loaded for the USB MODEM.

Step 209: respectively mapping the USB moderns to gateways.

In this step, the USB MODEM which has been loaded with the driver and the instruction set is mapped to a gateway, and the gateway presents a gateway interface to a management layer thereon, such as a pppx interface or a usbx interface, wherein x represents interface ID, which begins from 0 and will add 1 each time the mapping occurs. The specific interface type is determined by the USB MODEM type, if the USB MODEM is a serial port device, it is a pppx interface, and if the USB MODEM is a virtual network port device, it is a usbx interface.

Step 211: setting a domain grouping table.

The domain grouping table can be configured and generated by the users themselves and be dynamically updated according to the situation of users' data access. For example, the users can set that one or more IP address segments of the services provided by Telecom correspond to a certain one of a plurality of gateways, and set one or more IP address segments of the services provided by Netcom correspond to another gateway.

Step 213, acquiring destination domain information.

When the user accesses the network or dials the telephone, the CPE acquires the IP address domain information to be accessed by the user or the destination voice number dialed by the user.

Step 215: determining a gateway corresponding to the destination domain information according to a preset domain grouping table.

The CPE determines a gateway corresponding to the destination IP address domain according to the IP address domain grouping table, or the CPE determines a gateway corresponding to the dialed destination voice number according to the destination voice domain grouping table.

Step 217: accessing data through a modem mapped with the determined gateway.

In the present embodiment, by setting a plurality of USB MODEMs with different systems in the CPE and mapping them to a plurality of different gateways, it enables the user to find a suitable gateway quickly according to the destination domain when using the services provided by different operators, and thus to access the services provided by different operators quickly and conveniently through a modem corresponding to this gateway, thereby effectively avoiding the phenomena that the speed of accessing or downloading is slow and the access cannot even be achieved when the users cannot select a suitable operator in the prior art.

Furthermore, compared using the USB MODEMs with using the other MODEMs, the existing CPE equipment USB interfaces can be used, thus the implementation is simple and the cost is saved. Moreover, the USB MODEMs do not need to be set within the CPE, and the space of the CPE can be saved, thereby improving the CPE's portability and enhancing the users' experience.

Figure 3:
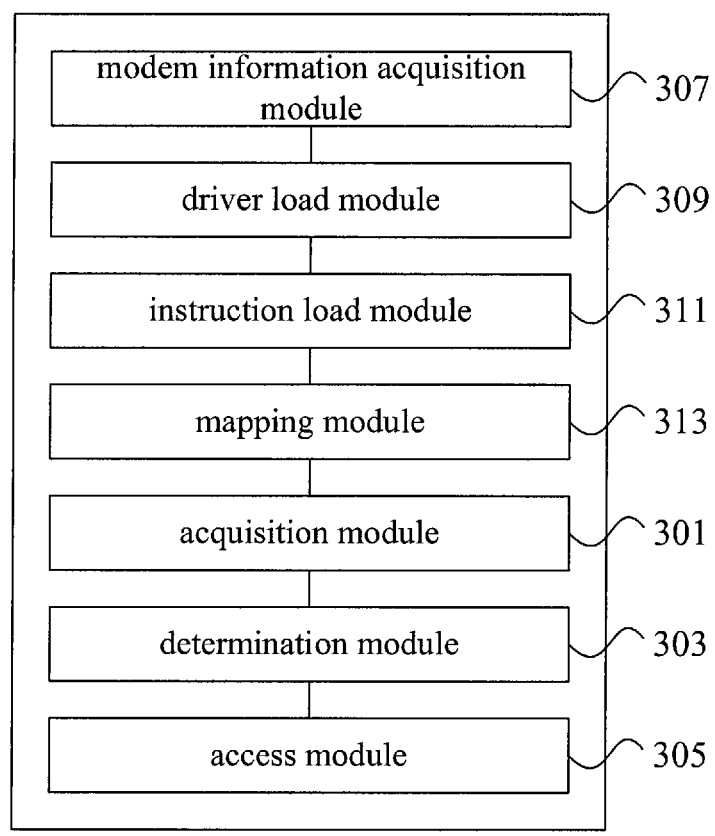
FIG. 3 is a structural block diagram of CPE according to embodiment 1 of the present invention.

With reference to FIG. 3, it shows a structural block diagram of the CPE according to embodiment 1 of the present invention and can specifically include:

an acquisition module 301, configured to acquire destination domain information;

a determination module 303, configured to determine a gateway corresponding to the destination domain information according to a preset domain grouping table;

wherein the domain grouping table is used to store a corresponding relationship between the destination domain information and the gateway, the domain grouping table can be an IP address domain grouping table and the destination domain information is IP address domain information; and the domain grouping table can also be a destination voice number grouping table and the destination domain information is a destination voice number;

an access module 305, configured to access data through a modem mapped with the determined gateway.

Preferably, the CPE of the present embodiment includes a plurality of USB interfaces which are configured to be connected respectively to USB modems with different systems.

Further, the CPE of the present embodiment also includes:

a modem information acquisition module 307, configured to acquire type information and system information of the plurality of USB modems;

a driver load module 309, configured to respectively load USB serial port drivers or USB network port drivers for the USB modems according to the type information;

an instruction load module 311, configured to respectively load drive instruction sets for the USB modems according to the system information; and a mapping module 313, configured to map the USB modems to the gateways respectively.

Specifically, a plurality of USB interfaces are set in the CPE and connected respectively to a plurality of USB MODEMs with different systems. The modem information acquisition module 307 acquires the type information and the system information etc. of the plurality of USB MODEMs, the driver load module 309 loads, according to the type information of each USB MODEM, the USB serial port driver or the USB network port driver for the USB MODEM, and then, the instruction load module 311 loads the drive instruction set for the USB MODEM according to the system information of the USB MODEM, and the mapping module 313 maps the USB MODEM loaded with the driver and the instruction set to a gateway.

Thereafter, when the user accesses data or dials the telephone, the acquisition module 301 of the CPE acquires destination domain information of the destination data or of the destination number, the determination module 303 determines a gateway corresponding to the destination domain information according to the preset IP address domain grouping table or the destination voice number grouping table, and then the access module 305 accesses the data or dials the telephone through the USB MODEM mapped with the gateway.

Figure 4:
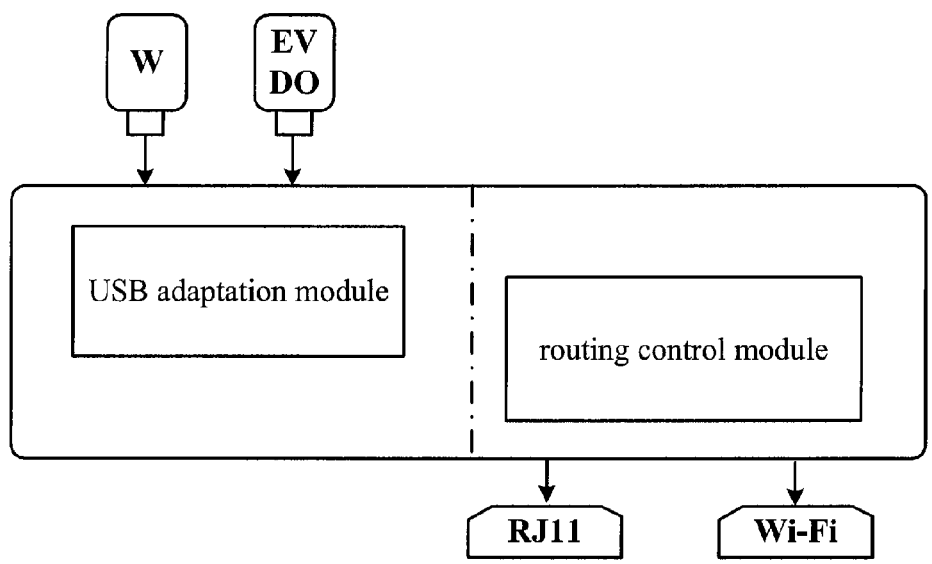
FIG. 4 is a schematic diagram of the basic framework of the CPE according to embodiment 2 of the present invention.

With reference to FIG. 4, it shows a schematic diagram of the basic framework of the CPE according to embodiment 2 of the present invention, and the present embodiment takes that two USB interfaces are set in the CPE and connected respectively to the USB MODEMs with two different systems as an example.

Specifically, two USB interfaces are set on the motherboard of the CPE and connected respectively to the USB MODEMs with two different systems, which are a W-MODEM and an EVDO-MODEM in the present embodiment. The USB MODEMs with two different systems are loaded with the driver and the instruction set by a USB adaptation module, so as to adapt each other and map to different gateways.

A routing control module is set with an IP address domain grouping table and a destination voice number grouping table. When a user accesses data or dials the telephone, the CPE selects a suitable gateway through the routing control module, and carries out the data access or dials the telephone through the USB MODEM corresponding to the gateway. In addition, in the present embodiment, the back end of the motherboard is also set with an RJ11 interface used for dialing CS (circuit switched) telephone and a 802.11 interface used for constituting WLAN (Wireless LAN, wireless local area network).

Figure 5:
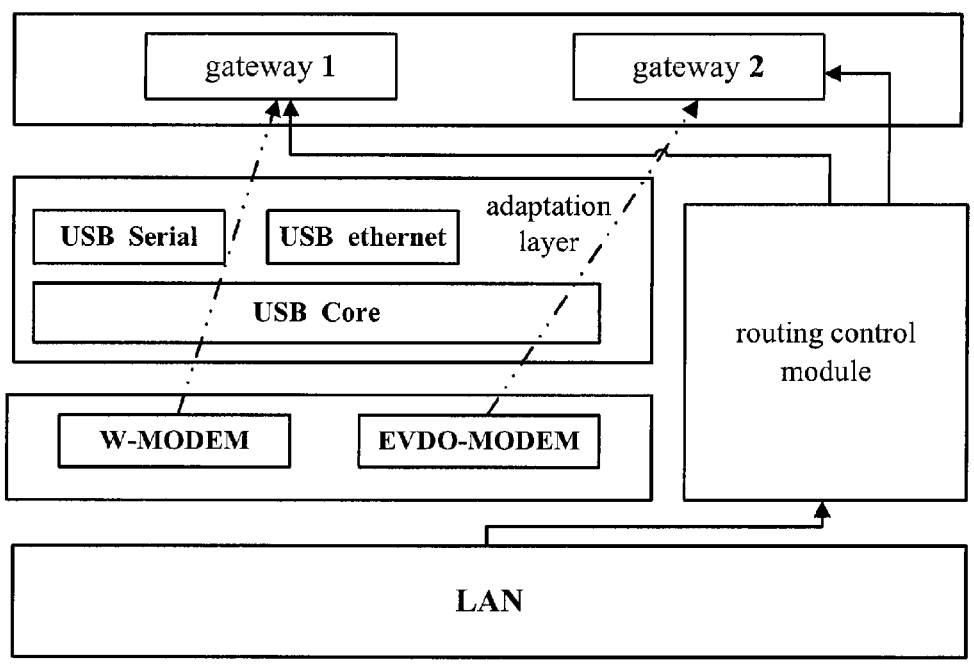
FIG. 5 is a schematic diagram of the software architecture of the CPE shown in FIG. 4.

The software architecture of the present embodiment is shown as FIG. 5, after the USB MODEMs with two different systems have been adapted by loading respectively the USB Serial driver and USB ethernet driver and the corresponding instruction set, the W-MODEM is mapped to gateway 1 and the EVDO-MODEM is mapped to gateway 2.

Figure 6:
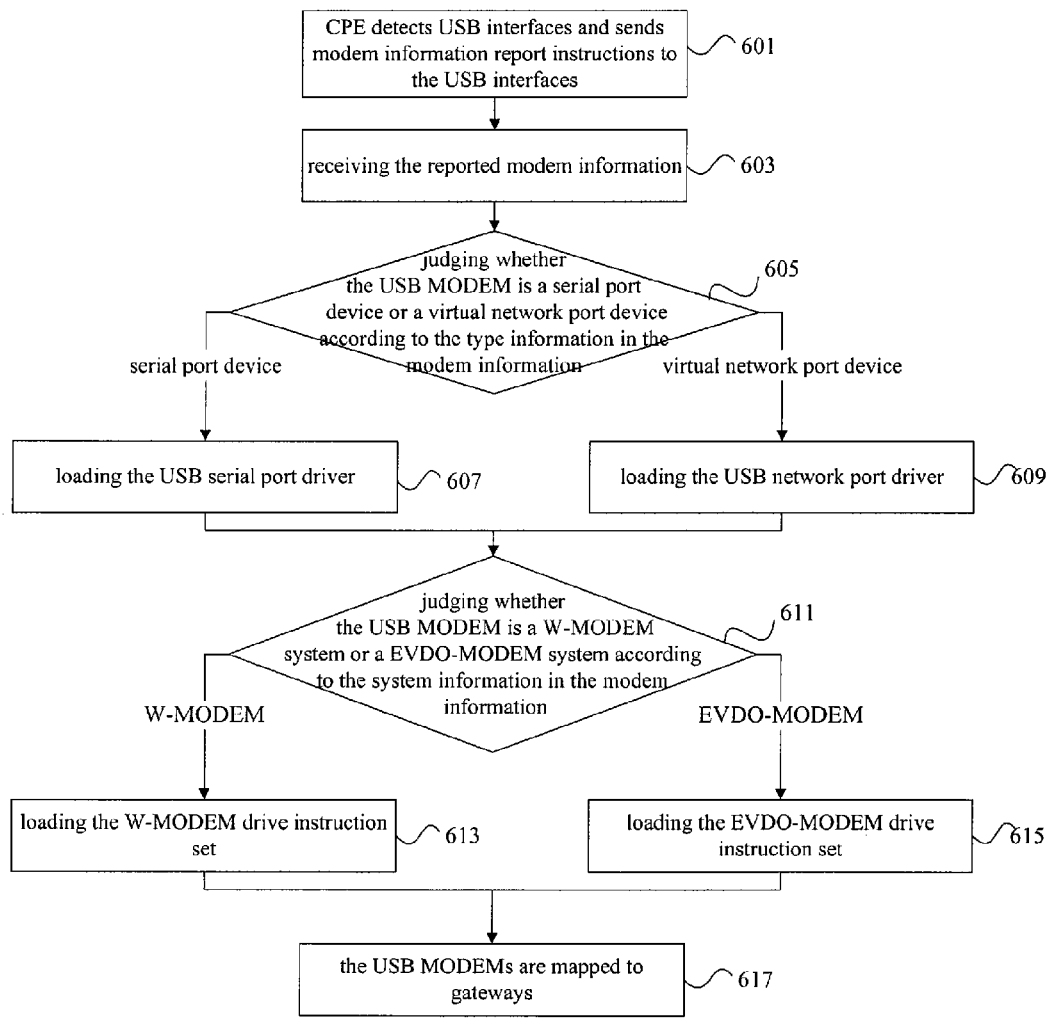
FIG. 6 is a step flow chart of establishing a mapping relationship between the gateway and the modem of the CPE shown in FIG. 4.

With reference to FIG. 6, it shows a step flow chart of establishing a mapping relationship between the gateway and the modem of the CPE shown in FIG. 4 and can specifically include steps as follows.

Step 601: the CPE detects USB interfaces and sends modem information report instruction to the USB interfaces;

when system initialization is preformed, the CPE host computer detects each USB interface and sends information report instruction to the USB interface, so as to make the USB interface report the information about the USB MODEM which is connected thereto.

Step 603: receiving the reported modem information;

the modem information reported by the USB interface can include: type information and system information of the USB MODEM, and it can also include manufacturer information and information about PID, VID, and CLASS ID and so on.

Step 605: it is judged whether the USB MODEM is a serial port device or a virtual network port device according to the type information in the modem information, wherein if it is a serial port device, step 607 is performed, and if it is a virtual network port device, step 609 is performed.

Step 607: USB serial port driver is loaded, and then turn to step 611;

for example, a USB Serial driver.

Step 609: USB network port driver is loaded, and then turn to step 611;

for example, a USB ethernet driver or a CDC ethernet driver.

Step 611: it is judged whether the USB MODEM is with a W-MODEM system or an EVDO-MODEM system according to the system information in the modem information, wherein if it is a W-MODEM, step 613 is performed, and if it is an EVDO-MODEM, then step 615 is performed.

Step 613: W-MODEM drive instruction set is loaded, and turn to step 617.

Step 615: EVDO-MODEM drive instruction set is loaded, and turn to step 617.

Step 617: the USB MODEMs are mapped to gateways.

Wherein, the W-MODEM is mapped to gateway 1 and the EVDO-MODEM is mapped to gateway 2.

The USB serial port device uses PPP protocol (point-to-point protocol), after passing through the stage of LCP (link control protocol) and IPCP (IP control protocol) of the PPP protocol, a pppx interface and an IP address, a DNS, a mask and a gateway etc. corresponding to the pppx interface are mapped in a network device list, and the CPE uses the PPP protocol to surf the web through the USB serial port device.

The USB virtual network port device uses NDIS (Network Driver Interface Standard), and in the present embodiment, the CPE controls the USB virtual network port device and carried out instruction interaction with the USB virtual network port device by using QMI (Qualcomm MSM/Modem Interface) instruction, which includes APN (Access Point Name) setting, user name, password, network connection, network disconnection and network state information update and so on.

Figure 7:
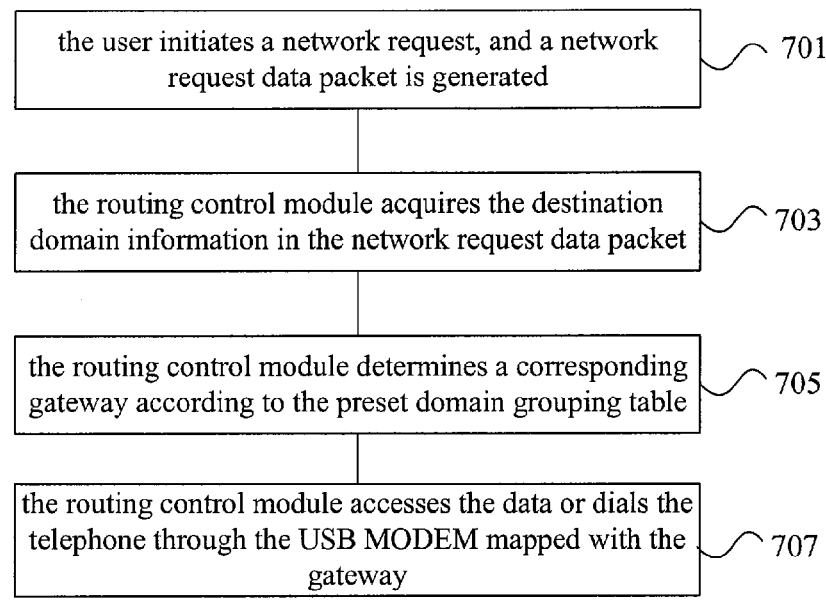
FIG. 7 is a step flow chart of performing the data access by applying the CPE shown in FIG. 4.

With reference to FIG. 7, it shows a step flow chart of performing the data access by applying the CPE shown in FIG. 4 and can specifically include the steps as follows.

Step 701: a user initiates a network request, and a network request data packet is generated;

wherein the network request data packet can be: an IP message data packet which contains a destination IP address; or, can be a voice number data packet which contains a destination number.

Step 703: a routing control module acquires destination domain information in the network request data packet.

When the network request data packet is an IP message data packet, the destination domain information thereof is the destination IP address; and when the network request data packet is a voice number data packet, the destination domain information thereof is the destination number.

Step 705: the routing control module determines a corresponding gateway according to a preset domain grouping table.

Figure 8:
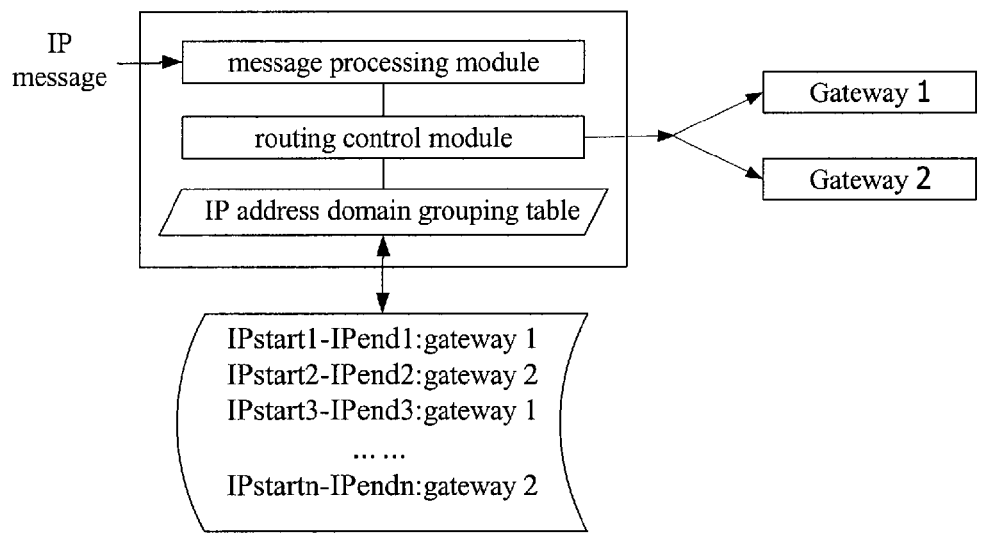
FIG. 8 is a schematic diagram of the IP message routing selection of the CPE shown in FIG. 4.

When the IP message data packet passes through the network layer, the routing control module extracts a destination IP address field in the message, searches a gateway corresponding to the field by using the IP address domain grouping table and returns the gateway interface pppx or usbx, as shown in FIG. 8.

Figure 9:
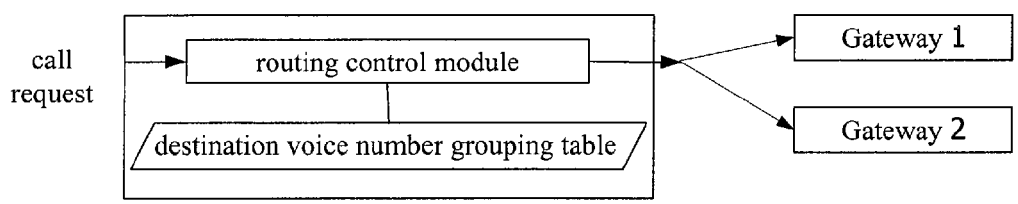
FIG. 9 is a schematic diagram of the voice gateway routing selection of the CPE shown in FIG. 4.

When the voice number data packet passes through the network layer, the routing control module extracts a destination number in the message, searches a gateway of the network to which the destination number belongs by using the destination voice number grouping table, and returns the gateway interface pppx or usbx, thereby determining to use which USB MODEM to act as an initiator of this call, as shown in FIG. 9.

Step 707: the routing control module accesses data or dials the telephone through the USB MODEM mapped with the gateway.

It can be seen from the above description that aiming at the services provided by different operators, by setting a plurality of modems with the different systems, the present invention enables the users to access quickly and conveniently when using the services without knowing the particular operator which provides the services, thereby improving greatly the speed and the efficiency of using services across the operators.

Obviously, those skilled in the art shall understand that the above modules and steps of the present invention can be realized by using general purpose calculating device, which can be integrated in one calculating device or distributed on a network which consists of a plurality of calculating devices, alternatively, they can be realized by using the executable program code of the calculating device, consequently, they can be stored in the storing device and executed by the calculating device, and in some cases the shown or described steps can be executed by orders which are different from herein, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A data accessing method used for customer premises equipment (CPE), the method comprising the following steps of:

acquiring destination domain information;

determining a gateway corresponding to the destination domain information according to a preset domain grouping table, wherein the domain grouping table is used to store a corresponding relationship between the destination domain information and the gateway; and accessing data through a modem mapped with the determined gateway;

wherein before the step of acquiring the destination domain information, the method comprises the steps of: (i) respectively connecting a plurality of universal serial bus (USB) interfaces of the CPE to USB modems with different systems, wherein the different systems correspond to services provided by different operators; (ii) respectively mapping the USB modems to gateways; and wherein the step of respectively connecting a plurality of USB interfaces of the CPE to USB modems with different systems comprises the following steps of: acquiring type information and system information of the plurality of USB modems; respectively loading USB serial port drivers or USB network port drivers for the USB modems according to the type information; and respectively loading drive instruction sets for the USB modems according to the system information.

2. The method according to claim 1, wherein the domain grouping table is an internet protocol (IP) address domain grouping table and the destination domain information is IP address domain information; or, the domain grouping table is a destination voice number grouping table and the destination domain information is a destination voice number.

3. A customer premises equipment CPE, comprising a processor configured to execute program units stored on a memory, the program units comprising:

an acquisition module, connected with a determination module and configured to acquire destination domain information;

the determination module, connected with the acquisition module and configured to determine a gateway corresponding to the destination domain information according to a preset domain grouping table, wherein the domain grouping table is used to store a corresponding relationship between the destination domain information and the gateway; and an access module, connected with the determination module and configured to access data through a modem mapped with the determined gateway;

wherein the CPE comprises a plurality of universal serial bus (USB) interfaces which are configured to be connected respectively to USB modems with different systems, wherein the different systems correspond to services provided by different operators; and a mapping module, configured to map the USB modems to gateways respectively; and wherein the program units further comprise: a modem information acquisition module, configured to acquire type information and system information of the plurality of USB modems; a driver load module, configured to respectively load USB serial port drivers or USB network port drivers for the USB modems according to the type information; and an instruction load module, configured to respectively load drive instruction sets for the USB modems according to the system information.

4. The CPE according to claim 3, wherein the domain grouping table is an internet protocol (IP) address domain grouping table and the destination domain information is IP address domain information; or, the domain grouping table is a destination voice number grouping table and the destination domain information is a destination voice number.

* * * * *